United States Patent [19]
Carroll et al.

[11] 3,794,063
[45] Feb. 26, 1974

[54] REFRIGERANT THROTTLING VALVE

[75] Inventors: Michael O. Carroll, Rosemont; Lawrence J. Shirek, Minneapolis, both of Minn.

[73] Assignee: Thermo King Corporation, Minneapolis, Minn.

[22] Filed: Jan. 23, 1973

[21] Appl. No.: 325,967

[52] U.S. Cl..... 137/505.26, 137/505.18, 137/625.3, 137/625.39, 62/217
[51] Int. Cl............................................. F16k 17/34
[58] Field of Search..... 137/505.18, 505.26, 625.28, 137/625.3, 625.33, 625.38, 625.39; 62/2.7; 251/205

[56] References Cited
UNITED STATES PATENTS
| | | | |
|---|---|---|---|
| 2,386,051 | 10/1949 | Kempton | 251/205 X |
| 2,615,671 | 10/1952 | Landon | 137/625.39 X |
| 2,854,025 | 9/1958 | Terry | 137/505.18 X |
| 3,698,204 | 10/1972 | Schlotterbeck | 62/217 X |

*Primary Examiner*—Harold W. Weakley
*Attorney, Agent, or Firm*—F. E. Blake

[57] ABSTRACT

This invention relates to a fluid pressure regulating valve that may be used for a refrigeration system and which includes an inlet, an outlet, and a first interface member therebetween having a plurality of fluid ports. Slidably disposed to be movable relative to the first member is a second interface member, the walls of which also include a plurality of fluid ports. The configuration of the respective fluid ports of the first interface member is different relative to the configuration of the respective ports of the second interface member to thereby perform throttling of the fluid passing therethrough in non-linear fashion to thus regulate the valve output as the movable member moves from fully open to fully closed valve position.

4 Claims, 10 Drawing Figures

OPEN

CLOSED

OPEN

CLOSED

REFRIGERANT THROTTLING VALVE

CROSS REFERENCES TO RELATED APPLICATIONS

So far as known, this application is not related to any pending patent application.

BACKGROUND OF THE INVENTION

Commercially available fluid pressure regulating valves that perform throttling of suction gas in a refrigeration system have had problems with stability and chattering. They also have had a wide pressure differential in order to get full stroke of the valve from opened to closed. Thus, under normal operation the valve inlet pressure will not be far enough from the valve set point to open the valve completely, and a pressure drop will be maintained across the valve when, ideally, it should be fully opened to avoid causing a drop in refrigerating capacity. A major design problem with the construction of conventional valves is that a slug of liquid refrigerant (freon) can be passed through the valve parts causing the valve to slam shut momentarily and then return to its original position. When the liquid slug passes from a region of higher pressure to one of lower pressure, it may flash to a vapor and cause large forces resulting in chattering.

It would therefore be desirable to design a fluid valve primarily for a refrigeration system which would perform throttling of the suction gas. It would also be desirable that the valve have large damping forces whereby quantities of fluid could be passed through without chattering. The valve should be compact in size yet have a high capacity while providing a fluid port configuration that insures stability and relatively narrow pressure differential in order to shift the valve from fully opened to fully closed.

PRIOR ART

Reference may be made to the following U.S. Pat. which generally shows a fluid pressure valve for a refrigeration system that includes a fixed ported interface sleeve member and a ported piston interface member slidably disposed relative to the sleeve: U.S. Pat. No. 2,309,773 Kaufman February, 1943

However, no patent is known which discloses a fluid pressure valve for a refrigeration system in which the configuration of the respective fluid ports of one of the interface members is different relative to the configuration of the respective ports of the other interface member such as to non-linearly regulate the output of the valve.

SUMMARY OF THE INVENTION

A fluid pressure regulating valve to be used within a refrigeration system is disclosed which is sensitive to only downstream suction pressure. The valve comprises an inlet, a fixed cylindrical interface sleeve member having a plurality of fluid ports, and a fluid outlet communicating with the inlet through the sleeve ports. Concentrically positioned and slidably disposed relative to the sleeve member is a pressure responsive interface piston member also having a plurality of fluid ports. The piston interface member can be stroked to open or close the valve upon a predetermined downstream pressure.

In accordance with the instant invention, the configuration of the respective ports of one of said interface members is different relative to the configuration of the respective ports of the other interface member. This port arrangement helps to throttle the suction gas when the port area is decreased and non-linearly regulates the valve output as the piston is stroked from a fully opening through a fully closing of the valve.

In one embodiment of the invention, the spacings between the centerlines of the respective ports of one interface member relating to the spacings of the respective ports of the other interface member is different. In an alternate embodiment, the port configuration includes the sizes of the respective ports of one interface member relative to the sizes of the respective ports of the other interface member being different.

DESCRIPTION OF THE PREFERRED EMBODIMENT

Figure 1:
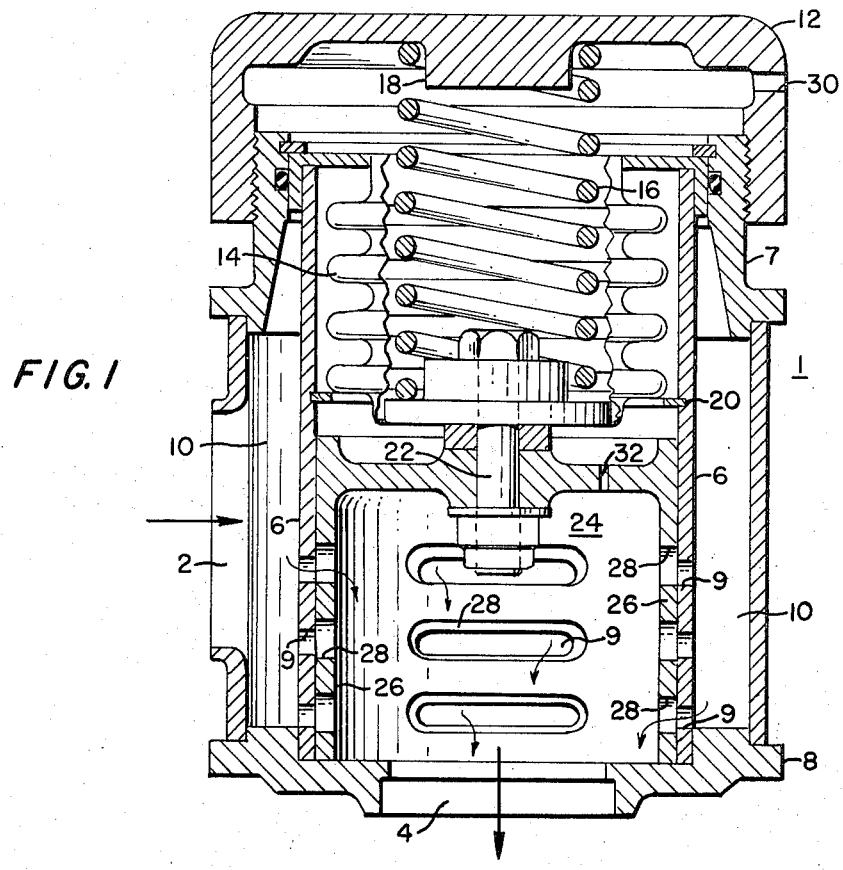
FIG. 1 is a cross section view of a fluid pressure valve having a port configuration of the present invention wide open to fluid flow.

Referring to FIG. 1 of the drawings, a fluid pressure regulating valve 1 is shown which may have application to the throttling of the suction gas of a refrigeration system. Valve 1 has a generally horizontal fluid inlet opening 2 and a vertical fluid outlet opening 4. Inlet 2 may be connected in line to the outlet of a refrigeration evaporator (not shown), and outlet 4 may be connected between the refrigeration suction line and the inlet of the compressor (also not shown), with the effect that the valve is situated within the refrigeration system to be responsive to downstream pressure only (as will later be described) while being insensitive to changes in the upstream pressure.

A first interface member, taking the form of a stationary cylindrical sleeve 6 in the preferred embodiment, is provided with a plurality of fluid ports 9 and is disposed between inlet and outlet openings 2 and 4. The sleeve 6 is secured between valve end members 7 and 8 and defines an annular fluid chamber 10 formed between the valve inlet and outlet. Valve 1 is enclosed by an adjusting cap 12 which is adapted to be screwed onto threads formed in valve end member 7, as shown.

Pressure sensing in the instant invention is accomplished by a conventional flexible bellows 14 located about a compression-type spring mechanism 16 which allows a set point to be established to cause the valve to be automatically actuated upon a predetermined downstream pressure and thereby prevent the suction pressure at the compressor from exceeding a maximum limit. The spring mechanism 16, which is supported by the bellows at the lower end and by a retention boss 18 formed in cap 12 at the upper end, enables the set point to be changed by screwing down adjusting cap 12 and thereby varying the compression of spring mechanism 16. Snap ring 20 is provided to limit the bellows travel under high pressure conditions.

Attached to the lower end of bellows 14 through a rod 22 is a pressure responsive, second interface member 24 which, in the preferred embodiment, can be a piston. The coupling of piston 24 to rod 22 can be effective to move the piston by action of the bellows 14. Piston 24 is concentrically fitted and slidably disposed to be movable relative to sleeve interface 6 in order that valve 1 may be opened or closed to regulate the fluid pressure therein, as will be explained more fully hereinafter. Walls 26 of piston 24 are also provided with a plurality of fluid ports 28. Ports 9 and 28 of sleeve interface member 6 and piston interface member 24 respectively co-operate to provide means by which the valve may operate to perform throttling of the suction fluid.

Figure 7:
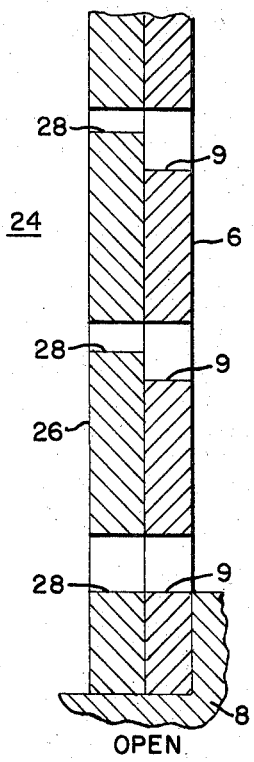
Figure 8:
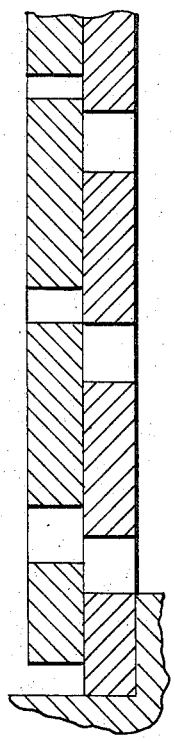
Figure 9:
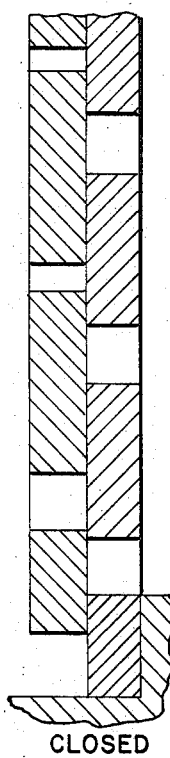

In accordance with the instant invention, the configuration of the respective ports of one of the interface members is different relative to the configuration of the respective ports of the other cooperating interface member. By way of example, the port configuration of sleeve 6 may be graduated, either progressively or otherwise, relative to the port configuration of movable piston 24 (as generally shown in FIGS. 3 to 5), but, it is to be understood that the port configuration of the sliding piston interface walls 26 may also be made suitably different relative to the ports of sleeve 6 (as generally shown by FIGS. 7-9).

Figure 3:
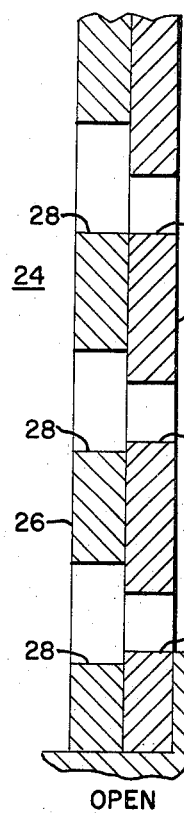
FIGS. 3 to 5 and 7 to 9 are alternate port configurations of the valve progressively stroked from fully open to fully closed.
Figure 4:
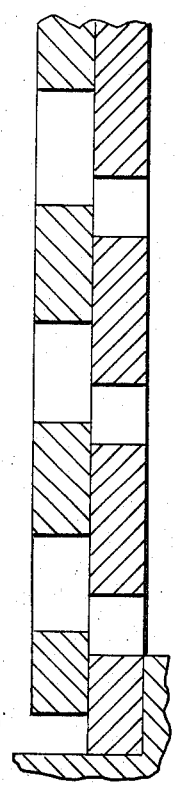
Figure 5:
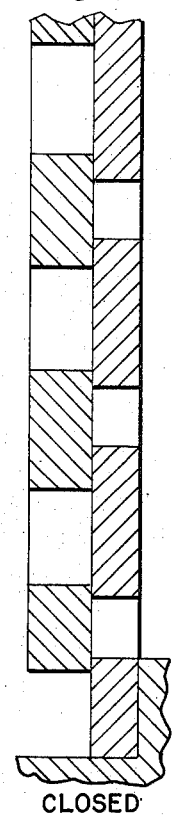

More particularly, one form of accomplishing fluid throttling is the embodiment illustrated by the port configuration of FIG. 3-5. Ports 9 are so disposed in sleeve 6 that the distance between the centerlines of each succeeding port is different, while the distance between the centerlines of each succeeding port 28 of piston walls 26 are maintained at a constant dimension. An alternate port configuration within the scope of the instant invention and embodied generally in FIGS. 7-9 is to vary the sizes of each succeeding fluid port 28 disposed in piston walls 26 while maintaining the size of the ports 9 of sleeve 6 to be one of a constant dimension.

OPERATION OF FLUID PRESSURE REGULATING VALVE

The spring rate of bellows 16 and the force exerted by the adjusting cap 12 while compressing spring 16 in arriving at a desired setpoint determines the pressure at which the fluid ports of valve 1 cooperate to be fully closed to fluid. Bellows 16 may be vented to the atmosphere through an orifice 30 drilled in cap 12 in order to obtain an atmospheric pressure reference. The pressure on the face of the bellows acts to oppose the force of compression spring 16. If the compressor is started up after the pressure in the system has had time to stabilize and at a pressure higher than the set point of the valve, piston 24 will be initially disposed at a position with respect to sleeve 6 such that fluid ports 9 and 28 will cooperate to be fully closed (FIGS. 5 and 9) thereby preventing fluid refrigerant from flowing to the compressor, and piston 24 will be bottomed against snap ring 20. After the compressor starts up, the pressure at the valve outlet 4 immediately drops and piston 24 will be automatically moved slightly away from snap ring 20 by bellows 14 and to such a position with respect to sleeve 6 that fluid ports 9 and 28 are now opened sufficiently to maintain the downstream pressure at the level corresponding to the set point of the valve. Bellows 14 is responsive to a downstream pressure signal received through a small orifice 32 in the face of the piston 24, while being non-responsive to the inlet or upstream pressure. Orifice 32 allows fluid to pass to the bellows at a relatively slow rate, thereby damping the movement of piston 24 to prevent the piston from chattering due to forces occurring from any rapid changes in the fluid passing from a region of higher pressure to one of lower pressure.

Figure 2:
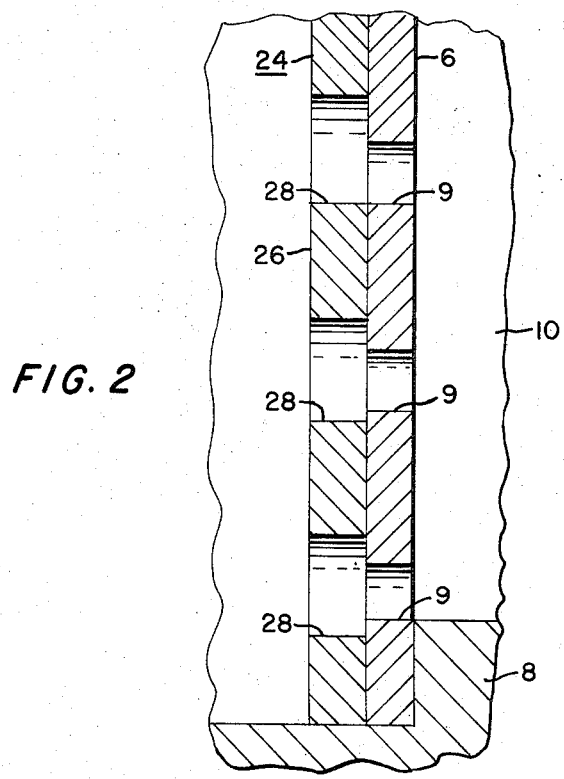
FIG. 2 is a detailed view of the port configuration of FIG. 1.

After a continuous running of the refrigeration system, the pressure at the valve inlet will normally drop below the setpoint. The compressor becomes able to pump fluid refrigerant at a downstream suction pressure below that of the setpoint, and the corresponding pressure of bellows 14 will cause piston 24 to be moved further away from snap ring 20. As the downstream pressure continues below the set point, each of the valve ports 9 and 28 will be opened progressively further, but at slightly different points of the piston stroke due to the relatively different nature of the port configuration of one interface member with respect to the other. Eventually, a point is reached where the bellows has opened the ports to a fully open position where both the valve inlet and outlet pressure will be below the set point. In a wide opened condition (FIGS. 1 and 2), the fluid is free to flow through the valve substantially unimpeded, and except for the slight pressure drop caused by friction, the pressure drop across the valve will be eliminated.

Figure 6:
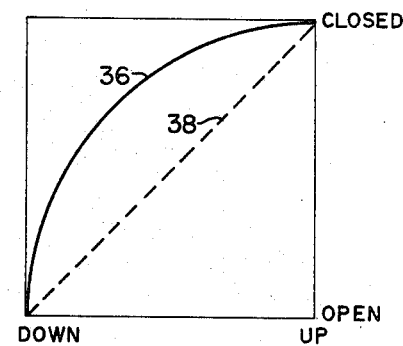
FIGS. 6 and 10 are diagrammatic representations of the non-linear fluid flow pattern occurring when employing the fluid port configurations of FIGS. 3 to 5 and 7 to 9 respectively.
Figure 10:
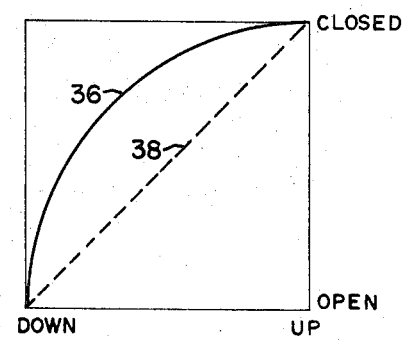

The relatively sliding ports 28 in interface piston walls 26 with respect to the fixed ports of the interface sleeve member 6 cause a gradual pressure drop across the valve and a subsequent throttling of the suction fluid whenever the fluid port areas are decreased, while the relatively different port configuration of one interface member with respect to the port configuration of the cooperating interface member results in a generally stable valve of the type requiring a narrow pressure differential to stroke the valve from fully closed to fully opened. The valve can maintain a high flow rating, while the sliding port arrangement provides a means to non-linearly regulate the flow of fluid as the piston is moved from a fully opened position to a fully closed position of the valve. FIGS. 3 to 5 and FIGS. 7 to 9 show the progressive movement of sliding piston member 24 with respect to fixed sleeve 6 at positions through which the valve is stroked fully opened to fully closed. FIGS. 6 and 10 diagrammatically represent the non-linear fluid output pattern 36 of the valve obtainable by means of the alternate port configurations illustrated in FIGS. 3 to 5 and 7 to 9 respectively when the piston is moved from a fully opened position to a fully closed position of the valve as distinguished from a linear flow output 38 obtainable with conventional fluid pressure regulating valves.

The close fit between piston interface member 24 and sleeve interface member 6 causes an oil film to be sheared as the piston moves. The piston may be fabricated from material having a large mass (i.e., brass) which, together with the viscous drag caused by the shearing of the oil film, contributes to restricting the speed of the piston movement to further enhance damping and thereby prevent the valve from chattering. Other modifications will occur to those skilled in the art.

We claim:

1. A fluid pressure regulating valve comprising;
an inlet for receiving a fluid under pressure, a first interface member having a plurality of fluid ports, a fluid outlet communicating with said inlet by means of said ports, and a pressure responsive second interface member having a plurality of fluid ports and being slidably disposed relative to said first member to open or closed said valve upon a predetermined downstream pressure, the configuration of the respective ports of the one of said interface members being different relative to the configuration of the respective ports of the other interface member to thereby non-linearly regulate the flow of fluid between said inlet and outlet as said second member is moved from a fully opened position to a fully closed position of said valve.

2. The invention of claim 1, wherein the spacings between the centerlines of the respective ports of the first interface member relative to the spacings of the centerlines of the respective ports of the second interface member is different.

3. The invention of claim 1, wherein the sizes of the respective ports of the first interface member relative to the sizes of the respective ports of the second interface member is different.

4. The invention of claim 1, wherein said pressure responsive second interface member has an orifice therein and is bellows actuated, said valve also including a valve orifice communicating with the atmosphere surrounding the valve, said valve orifice providing means to obtain a pressure reference for said bellows to cause movement of said second interface member to open or close said valve upon a predetermined downstream pressure, and said second interface member orifice providing means through which fluid may pass to said bellows to thereby dampen the movement of said second interface member.

* * * * *